(12) United States Patent
Iwata et al.

(10) Patent No.: US 11,453,295 B2
(45) Date of Patent: Sep. 27, 2022

(54) CONTROL SYSTEM FOR VEHICLE

(71) Applicant: TOYOTA JIDOSHA KABUSHIKI KAISHA, Toyota (JP)

(72) Inventors: Takashi Iwata, Susono (JP); Taiga Hagimoto, Mishima (JP); Hideto Wakabayashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 17/002,872

(22) Filed: Aug. 26, 2020

(65) Prior Publication Data

US 2021/0078411 A1 Mar. 18, 2021

(30) Foreign Application Priority Data

Sep. 17, 2019 (JP) .............................. JP2019-168395

(51) Int. Cl.
| | | |
|---|---|---|
| *G06F 7/00* | (2006.01) | |
| *B60L 11/00* | (2006.01) | |
| *B60L 15/20* | (2006.01) | |
| *B60L 58/14* | (2019.01) | |
| *B60L 50/10* | (2019.01) | |
| *B60L 58/24* | (2019.01) | |
| *B60L 50/61* | (2019.01) | |

(52) U.S. Cl.
CPC .......... *B60L 15/2045* (2013.01); *B60L 50/10* (2019.02); *B60L 50/61* (2019.02); *B60L 58/14* (2019.02); *B60L 58/24* (2019.02); *B60L 2240/545* (2013.01)

(58) Field of Classification Search
CPC ...... B60L 15/2045; B60L 50/61; B60L 58/24; B60L 50/10; B60L 58/14; B60L 2240/545

USPC .......................................................... 701/22
See application file for complete search history.

(56) References Cited

U.S. PATENT DOCUMENTS

| | | | |
|---|---|---|---|
| 5,945,808 A | 8/1999 | Kikuchi et al. | |
| 2001/0024105 A1* | 9/2001 | Abe ....................... | B60L 58/10 |
| | | | 320/132 |
| 2012/0274285 A1* | 11/2012 | Chawla ................. | H01M 10/44 |
| | | | 320/127 |
| 2018/0354370 A1 | 12/2018 | Horii | |

FOREIGN PATENT DOCUMENTS

| | | |
|---|---|---|
| JP | H10-295045 A | 11/1998 |
| JP | 2011-079447 A | 4/2011 |
| JP | 2013-177091 A | 9/2013 |
| JP | 2017-094894 A | 6/2017 |

\* cited by examiner

*Primary Examiner* — Daniel Kessie
*Assistant Examiner* — Dru Parries
(74) *Attorney, Agent, or Firm* — Oliff PLC

(57) ABSTRACT

A control system for a vehicle to prevent a reduction in a drive force due to increase in an internal resistance of a battery. A controller calculates a command value of an output power of the battery to be transmitted to a motor in future, and predicts an internal resistance of the battery at the point to discharge the electric power from the battery in the amount of the command value. If it is expected that the battery will not be possible to discharge the electric power in the amount of the command value, the controller reduces a load on the battery by increasing an amount of the electric power supplied to the motor from the generator before the battery can no longer discharge the electric power in the amount of the command value.

9 Claims, 12 Drawing Sheets

CONTROL SYSTEM FOR VEHICLE

CROSS-REFERENCE TO RELATED APPLICATIONS

The present disclosure claims the benefit of Japanese Patent Application No. 2019-168395 filed on Sep. 17, 2019 with the Japanese Patent Office, the disclosure of which are incorporated herein by reference in its entirety.

BACKGROUND

Field of the Invention

Embodiments of the present invention relate to the art of a drive control system for a vehicle propelled by supplying electricity to a drive motor from at least one of a generator and a battery.

Discussion of the Related Art

JP-A-2011-79447 describes a hybrid travelling control system for a hybrid vehicle having a generator which translates a power generated by an engine into an electric power, and a motor to which the electric power generated by the generator and an electric power accumulated in a battery are supplied to generate a drive force. In order to avoid a restriction on an output power of the battery due to rise of an internal resistance, the control system taught by JP-A-2011-79447 calculates a total sum of a current charged and discharged to/from the battery within a predetermined period of time, and a square of said current. According to the teachings of JP-A-2011-79447, the current of the battery is controlled in such a manner that the total sum of said current will not exceed a first threshold value, and that the total sum of the square of said current will not exceed a second threshold value.

JP-A-H10-295045 describes a hybrid electric vehicle with battery management. According to the teachings of JP-A-H10-295045, a maximum electric power is computed based on a temperature of a battery and a state of charge of the battery. If the battery cannot output an electric power demanded, an output power of an engine is converted into an electric power by a generator, and the electric power converted by the generator is supplied to a motor.

JP-A-2013-177091 describes a control apparatus of hybrid vehicle configured to consume electricity accumulated in a battery to a lower limit value of a charge amount when the vehicle reaches a preset planned charge point. According to the teachings of JP-A-2013-177091, when a distance to the preset planned charge point is reduced shorter than a preset value, an interim target level of a state of charge of the battery is reduced with a reduction in the distance to the preset planned charge point, and a maximum generation amount of a generator is increased.

JP-A-2017-94894 describes a control method for a hybrid vehicle comprising a motor connected to an output shaft of an engine, a high-voltage battery, an inverter that translates DC delivered from the battery into AC and further delivers to the motor, a low-voltage battery connected to the high-voltage battery, and a DC/DC converter disposed between the high-voltage battery and the low-voltage battery. According to the teachings of JP-A-2017-94894, when a charging rate of the high-voltage battery becomes equal to or lower than a preset lower limit value, a control device executes control of obtaining a power consumption of a DC/DC converter and causing a motor generator to start power generation operation by an engine by which power equal to or greater than the power consumption is generated to charge the high-voltage battery.

As described, according to the teachings of JP-A-2011-79447, the current of the battery is reduced when the total sum of the current charged and discharged to/from the battery and the square of said current exceeds the threshold value. In this case, in order to generate a required power to propel the hybrid vehicle, it is necessary to cover the shortfall of the power by generating electric power by the generator and to supply the electric power generated by the generator to the motor, as taught by JP-A-H10-295045. Otherwise, it is necessary to cover the shortfall of the power by the engine and to deliver the power generated by the engine to drive wheels. However, if a maximum power of the engine is relatively small to be used e.g., in a range-extender vehicle, the required power to propel the vehicle may not be generated even if the engine generates the maximum power. In this case, therefore, the motor has to cover the shortfall of the power by supplying electricity to the motor from the battery. As a result, the output current of the battery may not be restricted as taught by JP-A-2011-79447, and hence the battery may be damaged. In addition, if the battery is damaged thermally, the required power to propel the vehicle may not be generated.

SUMMARY

Aspects of embodiments of the present disclosure have been conceived noting the foregoing technical problems, and it is therefore an object of the present disclosure to provide a control system for a vehicle configured to prevent a reduction in a drive force due to increase in an internal resistance of an electric storage device.

The control system according to the exemplary embodiment of the present disclosure is applied to a vehicle comprising: a motor as a prime mover that is connected to a pair of drive wheels to deliver torque to the drive wheels; an electric storage device that is connected to the motor to supply an electric power to the motor, and whose available output power is reduced due to increase in an internal resistance resulting from discharging the electric power continuously; and a generating system that is connected to the motor to supply an electric power to the motor without passing through the electric storage device. In order to achieve the above-explained objective, according to the exemplary embodiment of the present disclosure, the control system is provided with a controller that controls an output power of the electric storage device and a generation amount of the generating system. Specifically, the controller is configured to: calculate a command value of the output power of the electric storage device to be transmitted to the motor in a future time; predict the internal resistance of the electric storage device at the point to discharge the electric power from the electric storage device in the amount of the command value; calculate a predicted value of the available output power of the electric storage device in a future time based on the predicted internal resistance; determine whether it is possible to discharge the electric power from the electric storage device in the amount of the command value in a future time; and execute a load reducing control to reduce the output power of the electric storage device by increasing an amount of the electric power supplied to the motor from the generating system greater than the amount of the electric power supplied to the motor from the generating system of the case where it is expected that the electric storage device will be possible to discharge the electric power in the amount of the command value, before a point at which the electric storage device can no longer discharge the electric power in the amount of the command value, if it is expected that the electric storage device will not be possible to discharge the electric power in the amount of the command value.

In a non-limiting embodiment, the load reducing control may include a control to increase the generation amount of the generating system, if the electric power is supplied to the motor from the generating system before the point at which the electric storage device can no longer discharge the electric power in the amount of the command value.

In a non-limiting embodiment, the controller may be further configured to predict a timing at which a predetermined condition to start power generation of the generating system will be satisfied. In addition, the load reducing control may include a control to increase the amount of the electric power supplied to the motor from the generating system by advancing a timing to start power generation of the generating system to a point before a point at which the predetermined condition to start power generation of the generating system will be satisfied.

In a non-limiting embodiment, the load reducing control may include a control to increase the amount of the electric power supplied to the motor from the generating system by advancing a timing to start power generation of the generating system to a point before a point at which the predetermined condition to start power generation of the generating system will be satisfied, while increasing the generation amount of the generating system to a maximum value after starting power generation.

In a non-limiting embodiment, the controller may be further configured to correct the command value and the internal resistance based on the generation amount of the generating system during execution of the load reducing control.

In a non-limiting embodiment, the controller may be further configured to calculate the command value based on a change in the output power of the electric storage device within a predetermined past period of time.

In a non-limiting embodiment, the controller maybe further configured to increase the command value in accordance with reductions in an external temperature and an external pressure.

In a non-limiting embodiment, the controller may be further configured to predict the internal resistance based on at least any one of a temperature, a state of charge level, and a deterioration of the electric storage device, on the assumption that the electric storage device discharges the electric power in the amount of the command value.

In a non-limiting embodiment, the generating system may include an engine and a generator. A maximum output power of the engine may be smaller than a maximum output power of the motor.

Thus, according to the exemplary embodiment of the present disclosure, the controller predicts the required power to be discharged from the electric storage device, and determines whether it is possible to discharge the predicted required power from the electric storage device in future based on the internal resistance of the electric storage device which is increased depending on an operating condition. If it is expected that the electric storage device will not be possible to discharge the required electric power, the controller executes the load reducing control to reduce a load on the electric storage device by increasing an amount of the electric power supplied to the motor from the generating system greater than the amount of the electric power supplied to the motor from the generating system of the case where it is expected that the electric storage device will be possible to discharge the electric power in the amount of the command value, before a point at which the electric storage device can no longer discharges the required electric power. According to the exemplary embodiment of the present disclosure, therefore, the electric power supplied to the motor will not be reduced due to increase in the internal resistance of the electric storage device. For this reason, drive force to propel the vehicle will not be restricted due to restriction on the output power of the electric storage device.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
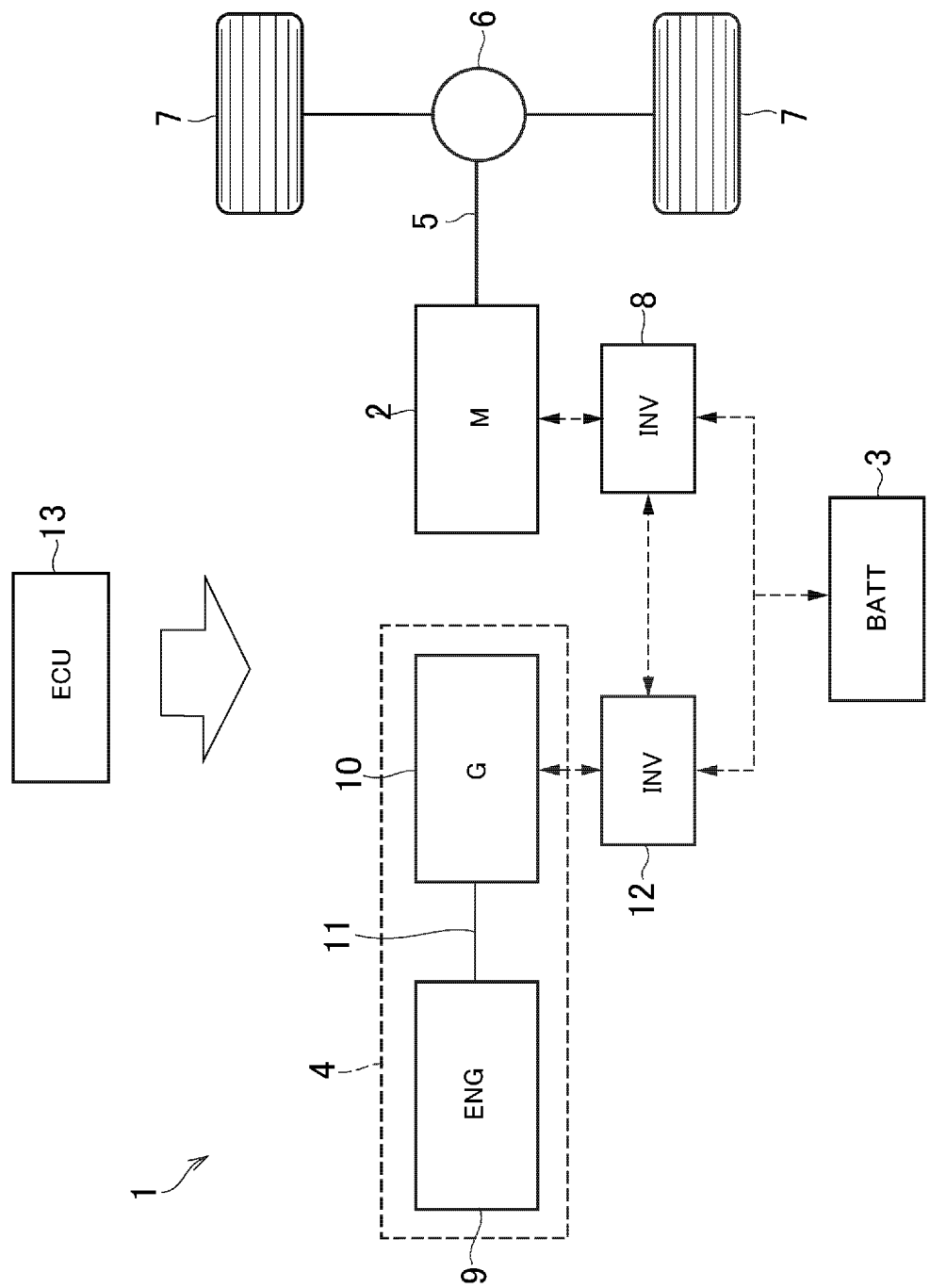
FIG. 1 is a schematic illustration showing a structure of a vehicle to which the control system according to the exemplary embodiment of the present disclosure is applied.

An exemplary embodiment of the present disclosure will now be explained with reference to the accompanying drawings. Referring now to FIG. 1, there is shown one example of a structure of a range extender electric vehicle (as will be simply called the "vehicle" hereinafter) 1 to which the drive control system according to the exemplary embodiment of the present disclosure is applied. As illustrated in FIG. 1, the vehicle 1 comprises a motor (referred to as "M" in FIG. 1) 2 serving as a prime mover, an electric storage device (referred to as "BATT" in FIG. 1) 3 that supplies an electric power to the motor 2, and an electrical power generating system 4 that generates an electric power to charge the electric storage device 3 and to cover a shortfall of the electric power supplied from the electric storage device 3 to the motor 2.

For example, as the conventional hybrid vehicles and electric vehicles, a permanent magnet-type synchronous motor may be adopted as the motor 2, and a pair of drive wheels 7 is connected to an output shaft 5 of the motor 2 through a differential gear unit 6. Optionally, an additional gar train such as a transmission may be arranged between the motor 2 and the drive wheels 7 to change a speed ratio between the motor 2 and the drive wheels 7. Thus, in the vehicle 1 shown in FIG. 1, a torque generated by the motor 2 is distributed to the drive wheels 7. Nonetheless, the control system according to the exemplary embodiment may also be applied to a vehicle in which each drive wheel is driven by an in-wheel motor, and a vehicle in which front wheels are driven by a front motor and rear wheels are driven by a rear motor.

The motor 2 serves as a prime mover to generate a torque to propel the vehicle 1 in both directions when an electric power is supplied thereto. In addition, the motor 2 may also serve as a generator to translate a kinetic energy of the vehicle 1 partially into an electric power when generating torque in a direction to reduce a speed of the drive wheel 7. The motor 2 is connected to the electric storage device 3 so that the motor 2 is operated as a motor by supplying the electric power to the motor 2, and that the electric storage device 3 is charged with the electric power generated by the motor 2.

For example, a lithium ion battery, a capacitor, and an all-solid-state battery may be adopted as the electric storage device 3, and the electric storage device 3 outputs direct current electricity (to be abbreviated as "DC electricity" hereinafter). On the other hand, the motor 2 is an alternating current motor (i.e., an "AC motor"). Therefore, an inverter 8 is disposed between the motor 2 and the electric storage device 3 so that DC electricity supplied from the electric storage device 3 is converted to alternating current electricity (to be abbreviated as "AC electricity" hereinafter) of predetermined frequency, and that AC electricity generated by the motor 2 is converted to DC electricity. Optionally, in order to boost a voltage of the electricity applied to the motor 2 (i.e., an input voltage), an additional coveter may be arranged.

In order to charge the electric storage device 3, and to generate electric power to be supplied to the motor 2 in addition to the electric power supplied from the electric storage device 3, the vehicle 1 is provided with the electrical power generating system 4. According to the exemplary embodiment of the present disclosure, the electrical power generating system 4 comprises an engine (referred to as "ENG" in FIG. 1) 9, and a generator (referred to as "G" in FIG. 1) 10 that translates kinetic power generated by the engine 9 into electric power.

For example, a gasoline engine and a diesel engine may be adopted as the engine 9, and the engine 9 generates power by burning air/fuel mixture. An output power of the engine 9 may be controlled by controlling an intake air, a fuel injection, and an ignition timing. As described, the engine 9 is used to charge the electric storage device 3 and to generate electricity to be supplied to the motor 2. For these purposes, a small engine whose maximum output is smaller than a maximum output of the motor 2 is adopted as the engine 9.

Various kinds of conventional generators may be adopted as the generator 10. According to the exemplary embodiment of the present disclosure, as the motor 2, an AC motor such as a permanent magnet-type synchronous motor is adopted as the generator 10. The generator 10 is connected to an output shaft 11 of the engine 9 so that the output power of the engine 9 is partially translated into the electric power by establishing a reaction torque by the generator 10, and that a speed of the engine 9 is controlled in an optimally fuel efficient manner by controlling the reaction torque of the generator 10. In addition, the engine 9 is cranked by operating the generator 10 as a motor.

As described, the AC motor is adopted as the generator 10. In order to convert AC electricity generated by the generator 10 to DC electricity, an inverter 12 is disposed between the generator 10 and the electric storage device 3. Optionally, a converter may be disposed between the generator 10 and the electric storage device 3.

The inverter 8 and the inverter 12 are connected to each other so that the electric power may be exchanged directly between the inverters 8 and 12 without passing through the electric storage device 3. That is, the electric power generated by the generator 10 may be supplied directly to the motor 2 instead of the electric storage device 3.

In order to control the motor 2, the inverter 8, the generator 10, the inverter 12, the engine 9 and so on, the vehicle 1 is provided with an electronic control unit (to be abbreviated as the "ECU" hereinafter) 13 as a controller. The ECU 13 comprises a microcomputer as its main constituent configured to perform calculation based on incident data and formulas as well as maps install in advance, and to transmit calculation results in the form of command signals to e.g., the motor 2, the generator 10, and the engine 9.

For example, the ECU 13 receives data from: an accelerator sensor that detects an operating amount of an accelerator pedal; a vehicle speed sensor that detects a speed of the vehicle 1; a resolver that detects a rotational angle and a speed of the motor 2; a pressure sensor that detects an external pressure; a temperature sensor that detects an external temperature; a level sensor that detects a state of charge (to be abbreviated as "SOC" hereinafter) level of the electric storage device 3; a battery temperature sensor that detects a temperature of the electric storage device 3; a current sensor that detects a current value of the electricity supplied from the electric storage device 3; and a voltage sensor that detects a voltage of the electricity applied to the motor 2.

In order to perform the calculation, for example, a map determining a required power (or drive force) to propel the vehicle 1 based on a position of the accelerator pedal and a vehicle speed, a map determining an internal resistance of the electric storage device 3, and a map determining deterioration of the electric storage device 3 are installed in the ECU 13.

The ECU 13 calculates a current value applied to the motor 2 and a frequency of the current, amounts of fuel and air supplied to the engine 9, and a current value applied to the generator 10 and a frequency of the current, based on the incident data and the maps. Calculation results are transmitted in the form of command signal from the ECU 13 to the inverter 8 and the inverter 12, or to a throttle valve and a fuel injector (neither of which are shown).

As described, a required drive force (or power) to propel the vehicle 1 is calculated based on a position of the accelerator pedal and a speed of the vehicle 1, and a required output torque of the motor 2 is calculated to achieve the required drive force. A target current value of the input voltage to the motor 2 is calculated based on the required output torque of the motor 2, and the electric power is supplied from the electric storage device 3 to the motor 2 based on the target current value. In addition, the engine 9 is activated as necessary to generate electric power to be supplied to the motor 2 by the generator 10. For example, when the SOC level of the electric storage device 3 falls close to a lower limit level, a required electric power to achieve the required power to propel the vehicle 1 cannot be supplied to the motor 2 only from the electric storage device 3. In this case, the engine 9 is activated to operate the generator 10 thereby generating an electric power corresponding to a shortfall of the power to propel the vehicle 1, and the electric power generated by the generator 10 is also supplied to the motor 2.

However, an internal resistance of the electric storage device 3 will increase temporarily if the electric storage device 3 is continuously charged or discharges electricity, and as a result, an output current from the electric storage device 3 will be restricted. Specifically, if high current is continuously discharged from the electric storage device 3, or if the electric storage device 3 is continuously charged with high current, the internal resistance of the electric storage device 3 will be increased promptly. That is, the internal resistance of the electric storage device 3 is increased with an increase in a load on the electric storage device 3.

Figure 2:
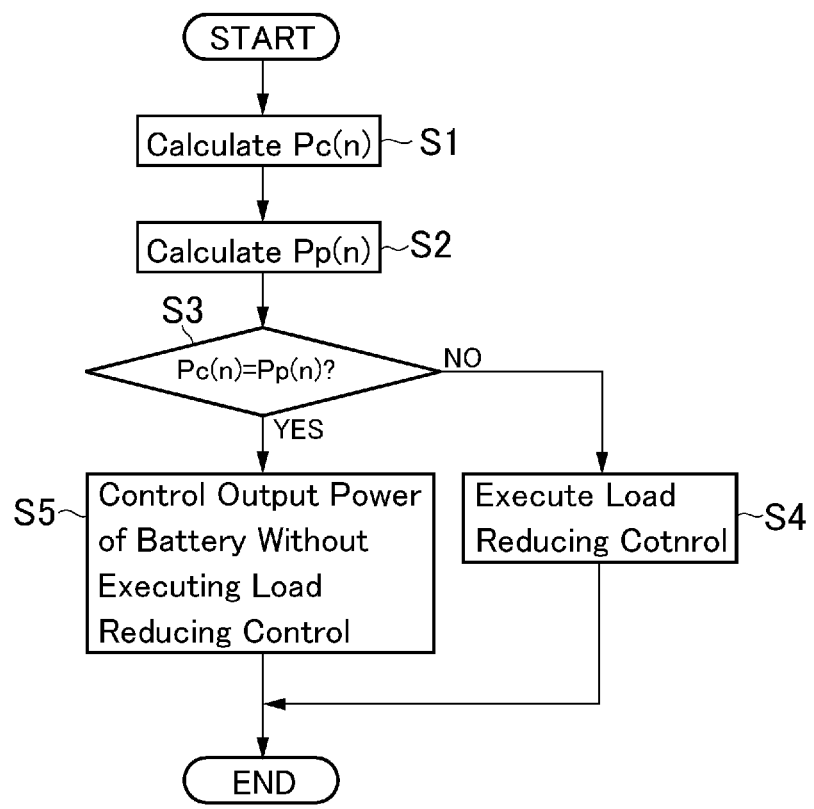
FIG. 2 is a flowchart showing one example of a routine executed by the control system according to the exemplary embodiment of the present disclosure.

According to the exemplary embodiment of the present disclosure, the control system is configured to prevent a reduction in the drive force to propel the vehicle 1 due to temporal reduction in the internal resistance of the electric storage device 3. To this end, specifically, the ECU 13 executes a routine shown in FIG. 2. At step S1, the ECU 13 calculates a command value Pc(n) of an output power of the electric storage device 3 to be transmitted in a future time. Specifically, the command value Pc(n) is calculated continuously at preset time intervals within a predetermined future period of time from the present time, based on a driving history up to the present time including a history of the output power.

Figure 3:
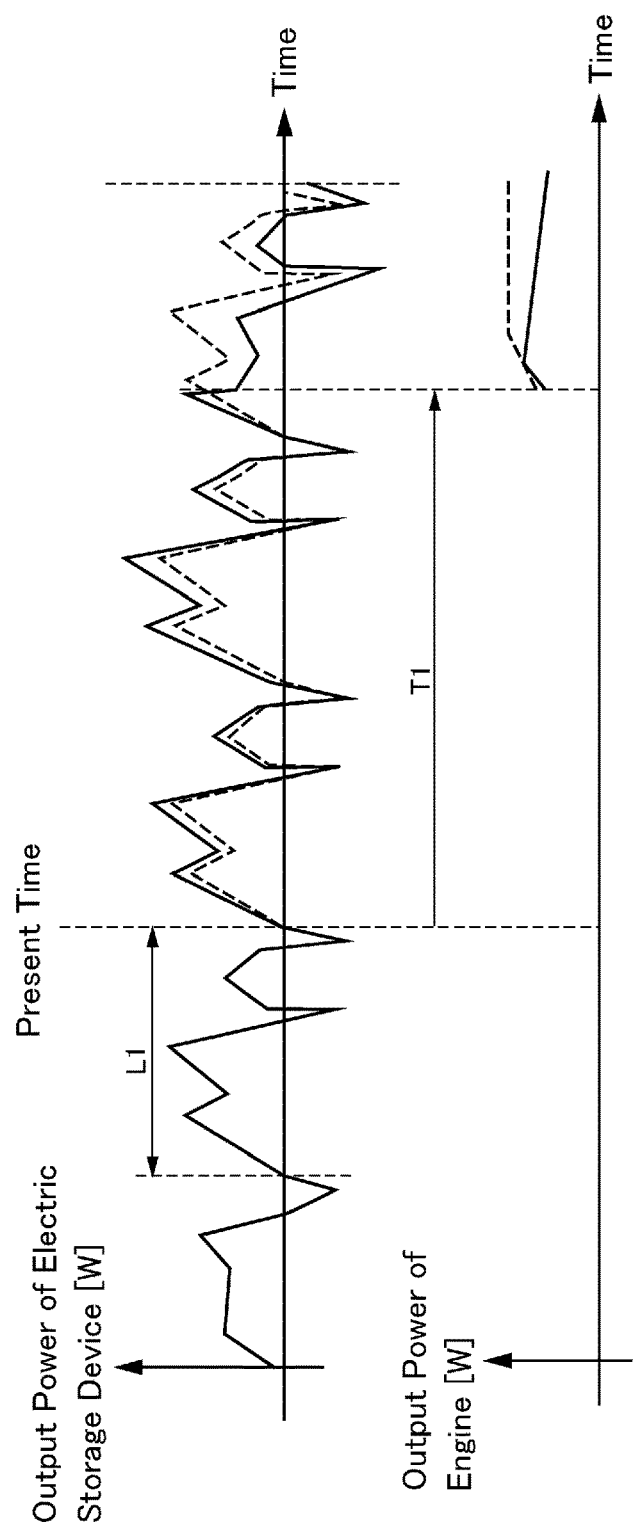
FIG. 3 is a map for predicting a future change in an output power of an electric storage device.

One example of a method (or means) of calculating the command value Pc(n) is shown in FIG. 3. First of all, a change in the output power of the electric storage device 3 within a predetermined past period of time L1 before the present time is stored in the ECU 13, and a map for predicting a future change in the output power of the electric storage device 3 is prepared based on the change in the output power of the electric storage device 3 within the past period of time L1. As indicated by the dashed line, according to the example shown in FIG. 3, the map is prepared in such a manner as to predict the future change in the output power of the electric storage device 3 from the present time for a period three times longer than the past period of time L1.

Then, the map thus prepared is corrected based on changes in an external temperature and an external pressure. For example, if both of the external temperature and the external pressure are dropping gradually, the ECU 13 presumes that the vehicle is travelling uphill, and corrects the map such that the output power of the electric storage device 3 increases gradually. In this case, if a reduction rate of the external pressure increases gradually, the ECU 13 presumes that a road grade increases gradually, and increases a correction amount of the map gradually. By contrast, if the reduction rate of the external pressure decreases gradually, the ECU 13 presumes that the road grade decreases gradually, and reduces the correction amount of the map gradually.

In addition, the ECU 13 predicts whether a condition to activate the generator 10 to prevent a reduction of an SOC level of the electric storage device 3 from the lower limit level will be satisfied after the lapse of a predetermined future period of time T1. For example, the condition to activate the generator 10 is satisfied when the SOC level of the electric storage device 3 falls to the lower limit level. If the condition to activate the generator 10 is expected to be satisfied after the lapse of the future period of time T1, the output power of the electric storage device 3 is corrected taking account of a fact that that the electric power generated by the generator 10 will be supplied to the motor 2 after the lapse of the future period of time T1. Specifically, a generation amount of the generator 10 is subtracted from the output power of the electric storage device 3 after the lapse of the future period of time T1. In this case, it is preferable to calculate the generation amount of the generator 10 based on an average speed of the vehicle 1 and a reduction (or reduction rate) of the SOC level of the electric storage device 3 during the past period of time L1.

In addition, an output power of the engine 9 varies depending on the intake air. That is, the output power of the engine 9 is reduced with a reduction in the external pressure. Therefore, the generation amount of the generator 10 is corrected in accordance with the external pressure.

In the upper section of FIG. 3, the solid line represents a change in the command value Pc(n) of the output power of the electric storage device 3 thus calculated. In the lower section of FIG. 3, the dashed line drawn after the lapse of the future period of time T1 indicates a change in the output power of the engine 9 without being corrected in accordance with the external pressure, and the solid line drawn after the lapse of the future period of time T1 indicates the output power of the engine 9 corrected in accordance with the external pressure.

Figure 4:
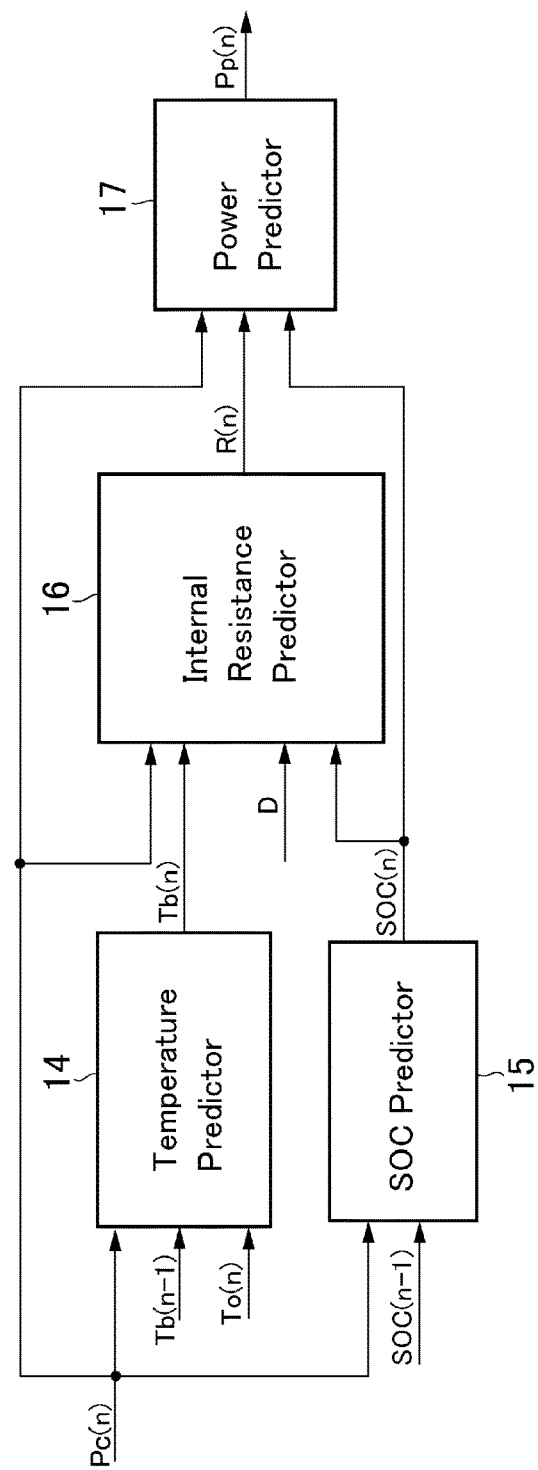
FIG. 4 is a block diagram showing procedures of calculating a predicted value of the output power of the electric storage device.

Turning back to FIG. 2, at step S2, the ECU 13 calculates a predicted value Pp(n) of the output power of the electric storage device 3 in a future time. Specifically, the predicted value Pp(n) is also calculated continuously at preset time intervals within the predetermined future period of time from the present time. One example of procedures to calculate the predicted value Pp(n) is shown in FIG. 4. First of all, the command value Pc(n) at a point of time to calculate the predicted value Pp(n), a temperature Tb(n−1) of the electric storage device 3 at a predetermined time prior to the point of time to calculate the predicted value Pp(n), and a current external temperature To are sent to a temperature predictor 14. Then, a temperature Tb(n) of the electric storage device 3 at the point of time to calculate the predicted value Pp(n) is calculated based on the above-mentioned data sent to the temperature predictor 14. Specifically, the temperature Tb(n) of the electric storage device 3 is calculated based on an amount of heat generation and an amount of heat discharge of the electric storage device 3 provided that the electric storage device 3 discharges the command value Pc(n).

In order to calculate the amount of heat generation of the electric storage device 3, a predetermined internal resistance of the electric storage device 3 of a case in which the internal resistance is not increased temporarily may be employed. Otherwise, since the amount of heat generation of the electric storage device 3 is increased with an increase in the internal resistance of the electric storage device 3, a predicted value Rp(n−1) of the internal resistance calculated at a predetermined time prior to the point of time at which the predicted value Pp(n) is calculated may also be employed to calculate the amount of heat generation of the electric storage device 3.

At the same time, the command value Pc(n) at the point of time to calculate the predicted value Pp(n), and an SOC level SOC(n−1) of the electric storage device 3 at a predetermined time prior to the point of time to calculate the predicted value Pp(n) are sent to an SOC predictor 15. Then, an SOC level SOC(n) of the electric storage device 3 at the point of time to calculate the predicted value Pp(n) is calculated based on the above-mentioned data sent to the SOC predictor 15. For example, an SOC level SOC(n+1) of the electric storage device 3 after a predetermined time from the present time is calculated based on a command value Pc(n+1) after the predetermined time from the present time, and a current SOC level SOC(n). Likewise, an SOC level SOC(n+2) of the electric storage device 3 after a predetermined time from a point of time at which the SOC level SOC(n+1) has been calculated is calculated based on a command value Pc(n+2) after the predetermined time from the point of time at which the SOC level SOC(n+1) has been calculated, and the SOC level SOC(n+1).

Then, an internal resistance R(n) of the electric storage device 3 at the point of time to calculate the predicted value Pp(n) is predicted by an internal resistance predictor 16. To this end, the temperature Tb(n) of the electric storage device 3, the SOC level SOC(n) of the electric storage device 3, the command value Pc(n), and a degree of deterioration D of the electric storage device 3 at the point of time to calculate the predicted value Pp(n) are sent to an internal resistance predictor 16. For example, the degree of deterioration D of the electric storage device 3 may be calculated based on an integrated value of the input power and the output power to/from the electric storage device 3. Here, it is to be noted that the internal resistance R(n) of the electric storage device 3 may be predicted based on at least one of the above-mentioned incident data. Instead, the internal resistance R(n) of the electric storage device 3 may also be predicted with reference to a map for determining the internal resistance R(n) based on an integrated value of the current value during operation of the electric storage device 3.

Thereafter, the command value Pc(n), the SOC level SOC(n), and the internal resistance R(n) are sent to a power predictor 17, and the power predictor 17 calculates the predicted value Pp(n) of the output power of the electric storage device 3 based on those incident data. Specifically, the power predictor 17 calculates an available output power of the electric storage device 3 taking account of the SOC level SOC(n) and the internal resistance R(n), and selects a smaller value out of the available output power thus calculated and the command value Pc(n) as the predicted value Pp(n).

Turning back to FIG. 2, at step S3, it is determined whether it is possible to discharge the electric power from the electric storage device 3 in the amount of the command value Pc(n) in future. In other words, at step S3, it is determined whether the command value Pc(n) and the predicted value Pp(n) at a predetermined future point of time are equal to each other. If the output power of the electric storage device 3 is restricted due to e.g., an increase in the internal resistance thereof and hence the predicted value Pp(n) at the predetermined future point of time is less than the command value Pc(n), the electric power may not be discharged from the electric storage device 3 in the amount of the command value Pc(n) at the predetermined future point of time, and hence the answer of step S3 will be NO. In this case, the routine progresses to step S4 to execute a load reducing control so as to reduce a load on the electric storage device 3 (i.e., to reduce the output power of the electric storage device 3). At step S4, specifically, the load on the electric storage device 3 is reduced by increasing a generation amount of the electrical power generating system 4 or by advancing a timing to start power generation of the electrical power generating system 4, while achieving the required drive force to propel the vehicle 1. Thereafter, the routine returns. For example, if the SOC level of the electric storage device 3 is expected to fall to the lower limit level, an output power of the engine 9 is increased to increase the generation amount of the generator 10. Before a point at which the electric storage device 3 can no longer discharge the electric power in the amount of the command value Pc(n), the generation amount of the generator 10 is increased greater than a generation amount of the generator 10 of the case where it is expected that the electric storage device 3 will be possible to discharge the electric power in the amount of the command value Pc(n) at the predetermined future point of time. Therefore, the amount of electric power supplied to the motor 2 from the electric storage device 3 is reduced. Otherwise, the engine 9 is started before the SOC level of the electric storage device 3 falls to the lower limit level and the drive force is restricted due to an increase in the internal resistance of the electric storage device 3. In this case, if the SOC level of the electric storage device 3 is not expected to fall to the lower limit level, the engine 9 may be started at a desired point to reduce the amount of electric power supplied to the motor 2 from the electric storage device 3 as necessary.

By contrast, if the command value Pc(n) and the predicted value Pp(n) at the predetermined future point of time are equal to each other, the electric power can be supplied from the electric storage device 3 to the motor 2 in the amount of the command value Pc(n). In this case, the answer of step S3 will be YES, and the routine progresses to step S5 to control the output power of the electric storage device 3 based on the command value Pc(n) without executing the load reducing control. Thereafter, the routine returns.

Figure 5:
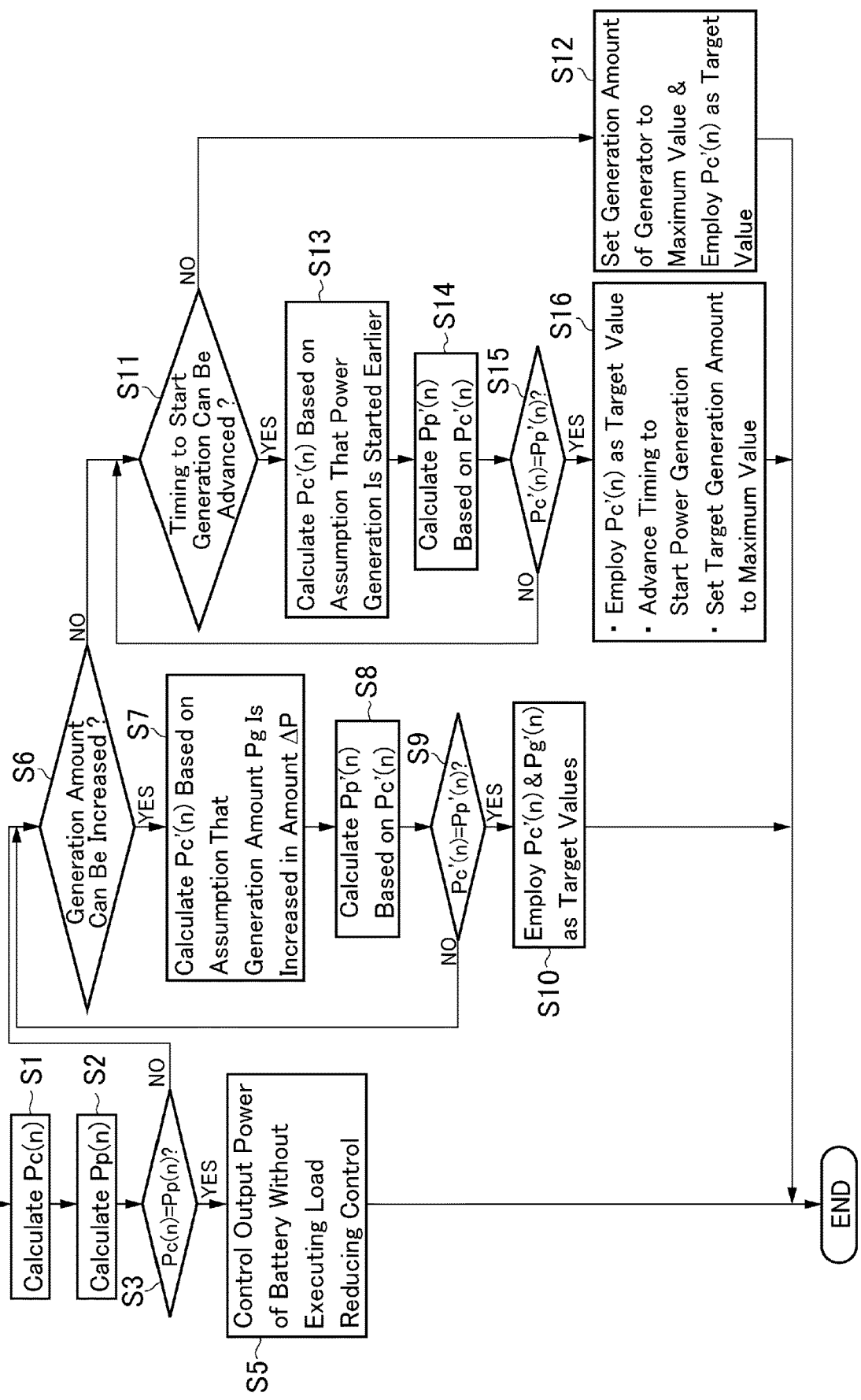
FIG. 5 is a flowchart showing one example of a subroutine to execute a load reducing control.

Here will be explained procedures of the load reducing control in more detail with reference to FIG. 5. As described, the command value Pc(n) of the output power of the electric storage device 3 is calculated at step S1, and the predicted value Pp(n) of the output power of the electric storage device 3 is calculated at step S2.

Figure 6:
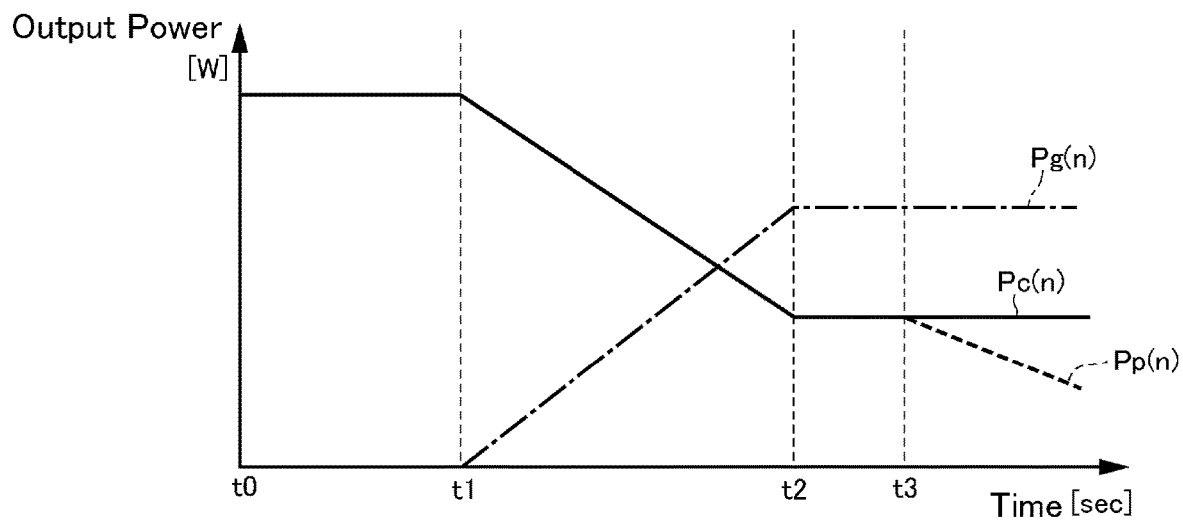
FIG. 6 is a time chart showing one example of a command value and the predicted value of an output power of the electric storage device.

Turning to FIG. 6, there is shown one example of the command value Pc(n) and the predicted value Pp(n) calculated based on an assumption that the vehicle 1 is propelled by a constant power. In FIG. 6, the solid line represents the command value Pc(n), the dashed line represents the predicted value Pp(n), and the dashed-dotted line represents the generation amount Pg(n) of the electrical power generating system 4. According to the example shown in FIG. 6, at point t0, the command value Pc is set to a value possible to achieve a required power to propel the vehicle 1, and the electrical power generating system 4 is not activated. Then, a satisfaction of the condition to activate the generator 10 is predicted at point t1. Consequently, the generation amount Pg(n) of the electrical power generating system 4 starts increasing gradually from point t1, and at the same time, the command value Pc(n) starts decreasing gradually from point t1.

At point t2, the generation amount Pg(n) of the electrical power generating system 4 is increased to a maximum value, however, the required power to propel the vehicle 1 may not be achieved only by the electric power generated by the electrical power generating system 4. In this situation, therefore, the electric storage device 3 discharges a certain amount of electric power even after point t2 so as to cover a shortfall of the electric power supplied to the motor 2. As described, the internal resistance of the electric storage device 3 is increased as a result of discharging the electric power continuously from the electric storage device 3, and the electric storage device 3 no longer can discharge the electric power in the amount of the command value Pc(n) from point t3. Consequently, as indicated by the dashed line, the predicted value Pp(n) falls below the command value Pc(n) gradually from point t3.

Turning back to FIG. 5, as also described, it is determined at step S3 whether the command value Pc(n) and the predicted value Pp(n) at the predetermined future point of time are equal to each other. According to the example shown in FIG. 6, the predicted value Pp(n) falls below the command value Pc(n) from point t3 so that the answer of step S3 will be NO. In this case, the routine progresses to step S6 to determine whether it is possible to increase an amount of the electric power Pg being generated by the electrical power generating system 4. For example, such determination at step S6 may be made by determining whether there is (or will be) a timing at which the engine 9 does (or will) not generate the maximum output power at present or in future. In this case, if there is (or will be) a timing at which the engine 9 does (or will) not generate the maximum output power, the answer of step S6 will be YES. Otherwise, such determination at step S6 may also be made by determining whether the generator 10 is generating the maximum power which might be changed depending on a temperature of the generator 10. In this case, if the generator 10 is generating the current maximum power, the answer of step S6 will be NO. According to the example shown in FIG. 6, the generation amount Pg of the electrical power generating system 4 is less than the maximum power output thereof within a period from point t1 to point t2. Therefore, the answer of step S6 will be YES within the period from point t1 to point t2.

Figure 7:
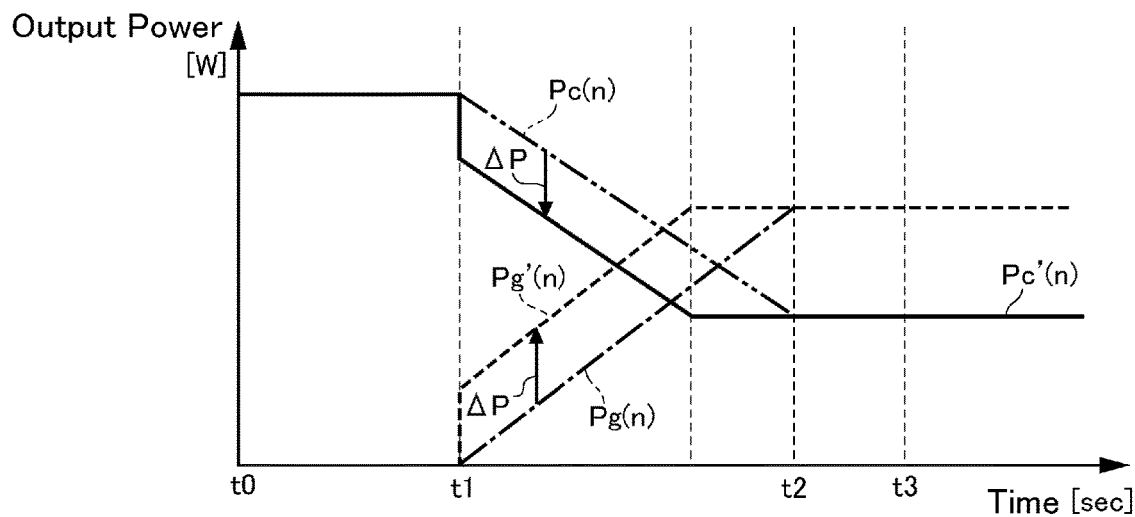
FIG. 7 is a time chart showing one example of correcting the command value by increasing generation amount of the generator.

If the generation amount Pg of the electrical power generating system 4 can be increased so that the answer of step S6 is YES, the routine progresses to step S7 to calculate a command value Pc'(n) based on an assumption that the generation amount Pg of the electrical power generating system 4 is increased in a predetermined amount $\Delta P$. Specifically, at step S7, the command value Pc'(n) is calculated based on an assumption that the generation amount Pg(n) of the electrical power generating system 4 at the point when the command value Pc(n) was calculated at step S1 is increased in the predetermined amount $\Delta P$. That is, at step S7, the command value Pc(n) calculated at step S1 is corrected to the command value Pc'(n) by subtracting the increased amount $\Delta P$ of the generation amount Pg(n) of the electrical power generating system 4 from the command value Pc(n). One example of the command value Pc'(n) calculated at step S7 is shown in FIG. 7. In FIG. 7, the solid line represents the command value Pc'(n) calculated at step S7, the dashed-two dotted line represents the command value Pc(n) calculated at step S1, the dashed line represents a generation amount Pg'(n) of the electrical power generating system 4 at the point when the command value Pc'(n) was calculated at step S7, and the dashed-dotted line represents the generation amount Pg(n) of the electrical power generating system 4 at the point when the command value Pc(n) was calculated at step S1.

Then, at step S8, a predicted value Pp'(n) is calculated based on an assumption that the electric storage device 3 discharges the electric power in an amount of the command value Pc'(n) calculated at step S7. Specifically, the predicted value Pp'(n) is calculated by substituting the command value Pc'(n) calculated at step S7 for the command value Pc(n) calculated at step S1 in the procedures to calculate the predicted value Pp(n) at step S2. In other words, the predicted value Pp'(n) is calculated by substituting an internal resistance predicted based on an assumption that the electric storage device 3 discharges the electric power in an amount of the command value Pc'(n) for the internal resistance which has been calculated previously. That is, the internal resistance R(n) of the electric storage device 3 is corrected based on the generation amount of the electrical power generating system 4.

Thereafter, it is determined at step S9 whether the predicted value Pp'(n) calculated at step S8 is substantially equal to the command value Pc'(n) calculated at step S7. That is, as the foregoing step S3, it is determined at step S9 whether the electric power can be supplied from the electric storage device 3 to the motor 2 in the amount of the command value Pc'(n).

If the predicted value Pp'(n) is substantially equal to the command value Pc'(n) so that the answer of step S9 is YES, the routine progresses to step S10 to set a target output power of the electric storage device 3 to the command value Pc'(n), and to set a target generation amount of the electrical power generating system 4 to the generation amount Pg'(n). Thereafter, the routine returns.

Figure 8:
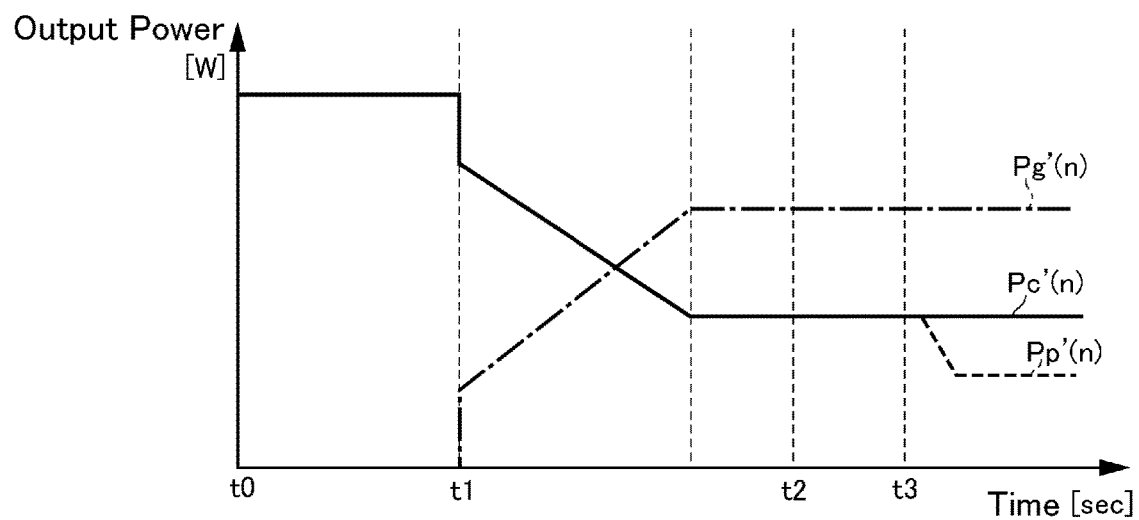
FIG. 8 is a time chart showing one example of the predicted value of the output power of the electric storage device corrected based on the corrected command value.

By contrast, if the predicted value Pp'(n) is less than the command value Pc'(n) as indicated in FIG. 8 so that the answer of step S9 is NO, the routine returns to Step S6. In this case, the command value Pc'(n) is updated repeatedly while increasing the generation amount Pg(n) of the electrical power generating system 4, until the electric power can be supplied to the motor 2 in the amount of the command value Pc'(n), or until the generation amount Pg(n) cannot be increased any longer.

Figure 9:
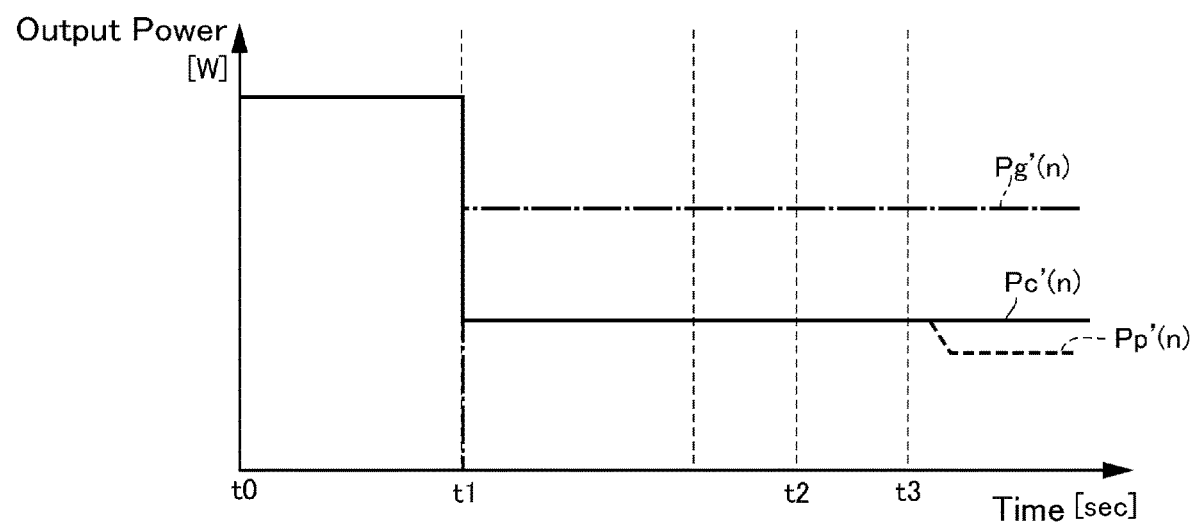
FIG. 9 is a time chart showing the command value of a case in which the generation amount of the generator has been increased to the maximum value.

Otherwise, if the generation amount Pg of the electrical power generating system 4 cannot be increased any longer, the answer of step S6 will be NO. For example, as indicated in FIG. 9, if the generation amount Pg(n) of the electrical power generating system 4 has been increased to the maximum value as a result of repeating step S7, the answer of step S6 will be NO. In this case, the routine progresses to step S11 to determine whether it is possible to advance a timing to start power generation of the electrical power generating system 4. If the electrical power generating system 4 has already started power generation so that the answer of step S11 is NO, the routine progresses to step S12 to continue power generation of the electrical power generating system 4. Specifically, at step S12, the generation amount of the electrical power generating system 4 is set to the maximum value, and a target value of the output power of the electric storage device 3 is set to the command value Pc'(n) calculated based on the generation amount of the electrical power generating system 4. Thereafter, the routine returns.

By contrast, if the timing to start power generation of the electrical power generating system 4 can be advanced so that the answer of step S11 is YES, the routine progresses to step S13 to calculate a command value Pc'(n) based on an assumption that the power generation of the electrical power generating system 4 is started predetermined time $\Delta t$ earlier than an end point of the future period of time T1 at which the condition to start the engine 9 is satisfied. Specifically, at step S13, the command value Pc'(n) is calculated based on an assumption that the power generation of the electrical power generating system 4 is started predetermined time Δt earlier than the point of time at which the power generation of the electrical power generating system 4 is started on the occasion of calculating the command value Pc(n) at step S1. For example, the timing to start power generation of the electrical power generating system 4 may be advanced by setting the lower limit level of the SOC level of the electric storage device 3 to a higher level.

Then, at step S14, a predicted value Pp'(n) is calculated based on an assumption that the electric storage device 3 discharges the electric power in an amount of the command value Pc'(n) calculated at step S13. Specifically, the predicted value Pp'(n) is calculated by substituting the command value Pc'(n) calculated at step S13 for the command value Pc(n) calculated at step S1 in the procedures to calculate the predicted value Pp(n) at step S2.

Thereafter, it is determined at step S15 whether the predicted value Pp'(n) calculated at step S14 is equal to the command value Pc'(n) calculated at step S13. That is, as the foregoing step S3, it is determined at step S15 whether the electric power can be supplied from the electric storage device 3 to the motor 2 in the amount of the command value Pc'(n).

If the predicted value Pp'(n) is equal to the command value Pc'(n) so that the answer of step S15 is YES, the routine progresses to step S16. At step S16, a target output power of the electric storage device 3 is set to the command value Pc'(n), the timing to start power generation of the electrical power generating system 4 is advanced to a point of time at which the predicted value Pp'(n) and the command value Pc'(n) are equalized to each other, and a target generation amount of the electrical power generating system 4 after starting the power generation is set to the maximum value. Thereafter, the routine returns.

Figure 10:
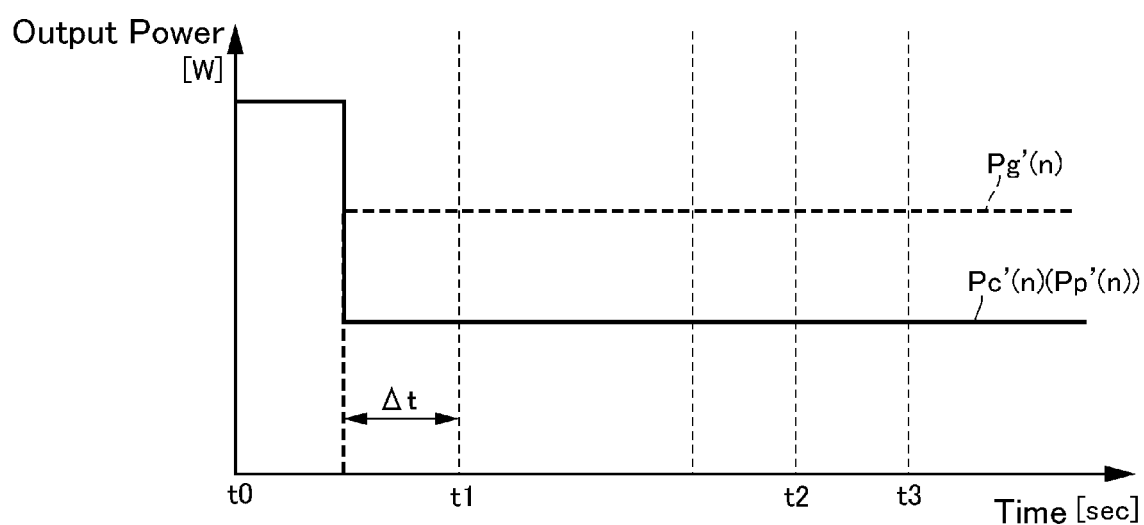
FIG. 10 is a time chart showing one example of advancing a timing to start power generation of the generator.

By contrast, if the predicted value Pp'(n) is less than the command value Pc'(n) so that the answer of step S15 is NO, the routine returns to Step S11. In this case, the timing to start power generation of the electrical power generating system 4 is advanced repeatedly by the predetermined time Δt until the predicted value Pp'(n) and the command value Pc'(n) are equalized to each other, or until the timing to start power generation of the electrical power generating system 4 cannot be advanced any longer. Turning to FIG. 10, there is shown one example of the command value Pc'(n) of the case in which the predicted value Pp'(n) and the command value Pc'(n) are equalized to each other as a result of advancing the timing to start power generation of the electrical power generating system 4. In FIG. 10, the solid line represents the command value Pc'(n), and the dashed line represents a generation amount Pg'(n) of the electrical power generating system 4 of this case.

If the command value Pc(n) and the predicted value Pp(n) are equal to each other so that the answer of step S3 is YES, the routine progresses to step S5 to control the output power of the electric storage device 3 based on the command value Pc(n) without executing the load reducing control.

Thus, if it is expected that the electric storage device 3 will not be able to discharge the electric power in the command value Pc(n) e.g., due to increase in the internal resistance, a generation amount of the electrical power generating system 4 is increased or a timing to start power generation of the electrical power generating system 4 is advanced to a point before the point at which the electric storage device 3 can no longer discharges the electric power in the amount of the command value Pc(n). According to the exemplary embodiment of the present disclosure, therefore, the load on the electric storage device 3 can be reduced in advance before the output power thereof is restricted due to increase in the internal resistance. For this reason, the drive force to propel the vehicle 1 will not be reduced due to lack of electric power supplied to the motor 2.

Moreover, the required output power of the electric storage device 3 after the present time is calculated while determining whether the vehicle 1 is travelling uphill and predicting a road grade. According to the exemplary embodiment of the present disclosure, therefore, the command value Pc(n) may be calculated accurately in line with an actual required output power of the electric storage device 3.

Further, a temperature and an SOC level of the electric storage device 3 in future are predicted based on the predicted output power of the electric storage device 3 (i.e., the command value), and an internal resistance of the electric storage device 3 is predicted based on the predicted command value, temperature and SOC level. According to the exemplary embodiment of the present disclosure, therefore, the electric power possible to be discharged from the electric storage device 3 in future can be predicted accurately.

Furthermore, if the generation amount of the electrical power generating system 4 cannot be increased any longer, the timing to start power generation of the electrical power generating system 4 is advanced. According to the exemplary embodiment of the present disclosure, therefore, the engine 9 can be prevented from being activated frequently, and an operating time of the engine 9 can be reduced.

Figure 11:
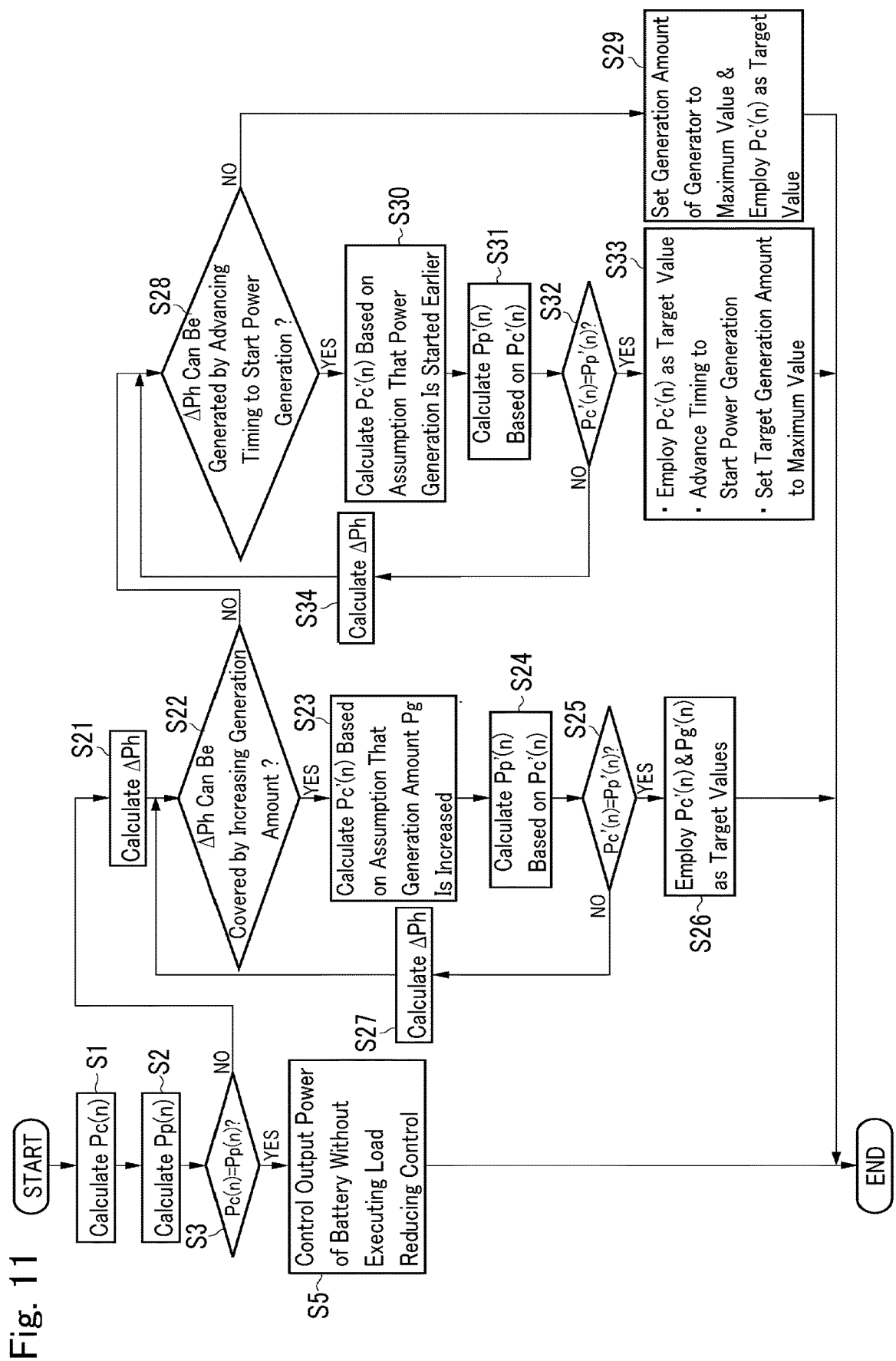
FIG. 11 is a flowchart showing another example of the subroutine to execute the load reducing control.

Turning to FIG. 11, there is shown another example of the subroutine to execute the load reducing control. As described, the command value Pc(n) of the output power of the electric storage device 3 is calculated at step S1, and the predicted value Pp(n) of the output power of the electric storage device 3 is calculated at step S2.

Figure 12:
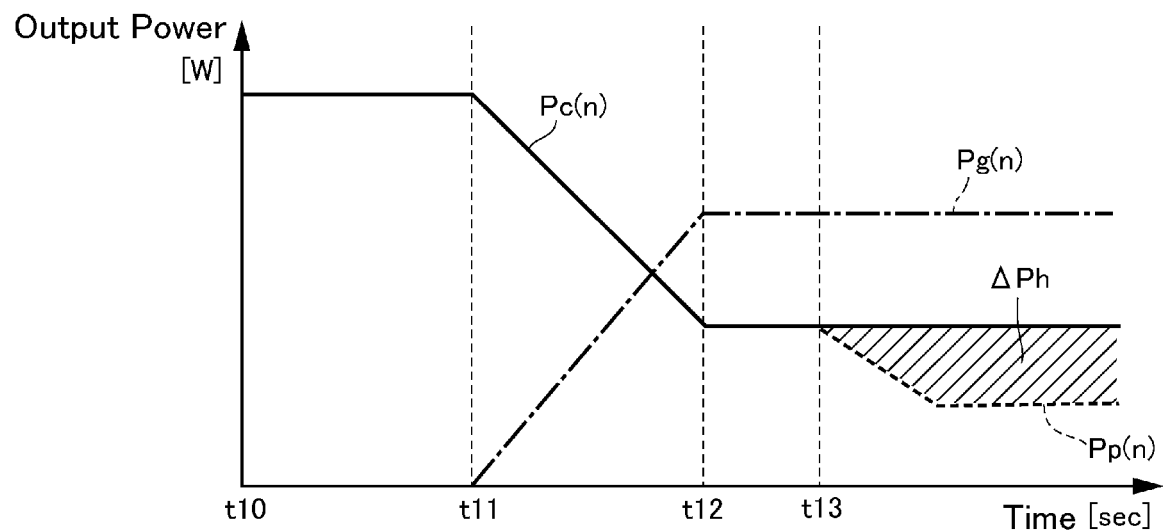
FIG. 12 is a time chart showing an example of a shortfall of the output power of the electric storage device.

Turning to FIG. 12, there are shown another example of the command value Pc(n) and the predicted value Pp(n) calculated based on an assumption that the vehicle 1 is propelled by a constant power. In FIG. 12, the solid line represents the command value Pc(n), the dashed line represents the predicted value Pp(n), and the dashed-dotted line represents the generation amount Pg(n) of the electrical power generating system 4. According to the example shown in FIG. 12, at point t10, the command value Pc is set to a value possible to achieve a required power to propel the vehicle 1, and the electrical power generating system 4 is not activated. Then, a satisfaction of the condition to activate the generator 10 is predicted at point t11. Consequently, the generation amount Pg(n) of the electrical power generating system 4 starts increasing gradually from point t11, and at the same time, the command value Pc(n) starts decreasing gradually from point t11.

At point t12, the generation amount Pg(n) of the electrical power generating system 4 is increased to the maximum value, however, the required power to propel the vehicle 1 may not be achieved only by the electric power generated by the electrical power generating system 4. In this situation, therefore, the electric storage device 3 discharges a certain amount of electric power even after point t12 so as to cover a shortfall of the electric power supplied to the motor 2. As described, the internal resistance of the electric storage device 3 is increased as a result of discharging the electric power continuously from the electric storage device 3, and the electric storage device 3 no longer can discharge the electric power in the amount of the command value Pc(n) from point t13. Consequently, as indicated by the dashed line, the predicted value Pp(n) falls below the command value Pc(n) gradually from point t13.

Turning back to FIG. 11, as also described, it is determined at step S3 whether the command value Pc(n) and the predicted value Pp(n) at the predetermined future point of time are equal to each other. According to the example shown in FIG. 12, the predicted value Pp(n) falls below the command value Pc(n) from point t13 so that the answer of step S3 will be NO. In this case, the routine progresses to step S21 to calculate a shortfall ΔPh of the electric power (i.e., energy) to propel the vehicle 1 by calculating the area of the hatched region after point t13. Specifically, the shortfall ΔPh may be calculated by integrating a difference between the command value Pc(n) and the predicted value Pp(n) from point t13 at which the predicted value Pp(n) starts falling below the command value Pc(n) to an end point of a calculation period.

Figure 13:
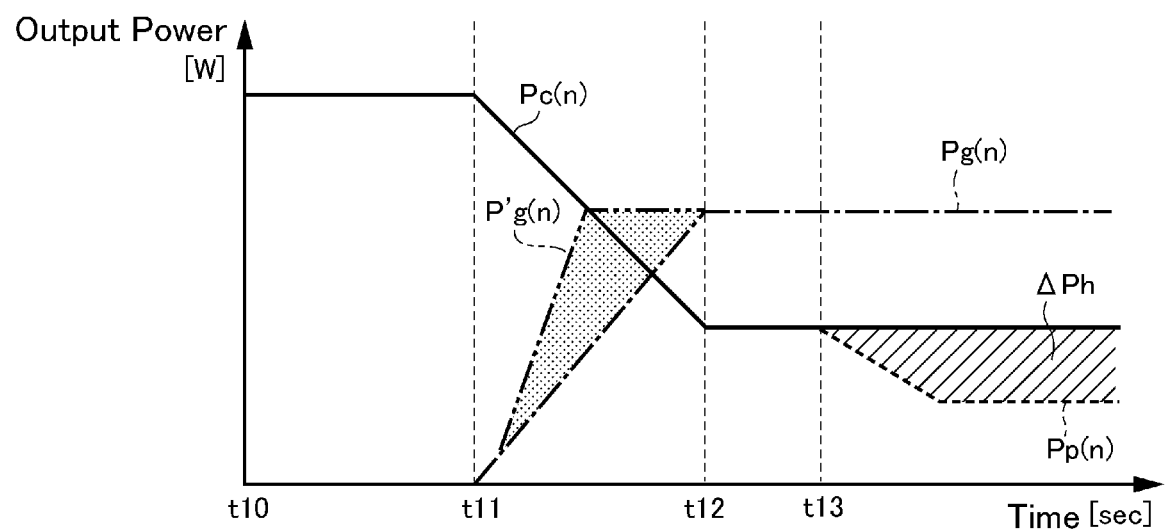
FIG. 13 is a time chart showing one example of the generation amount of the generator increased based on the shortfall of the output power of the electric storage device.

Then, it is determined at step S22 whether it is possible to cover the shortfall ΔPh calculated at step S21 by increasing the generation amount of the electrical power generating system 4. For example, if the generation amount of the electrical power generating system 4 is estimated to be increased to the maximum value, it is determined at step S22 whether it is possible to cover the shortfall ΔPh by reducing time to increase the generation amount of the electrical power generating system 4 to the maximum value. One example of a procedure to increase the generation amount of the electrical power generating system 4 is shown in FIG. 13. According to the example shown in FIG. 13, as indicated by the dashed-two dotted line, an increasing rate of the power generation of the electrical power generating system 4 is increased from a point after the lapse of a predetermined period of time from a point at which the power generation of the electrical power generating system 4 was started. Consequently, the generation amount of the electrical power generating system 4 is increased promptly to the maximum value. To this end, the increasing rate of the power generation of the electrical power generating system 4, and the timing to start increasing the increasing rate may be adjusted in such a manner as to equalize the dotted region in FIG. 13 to the shortfall ΔPh.

Figure 14:
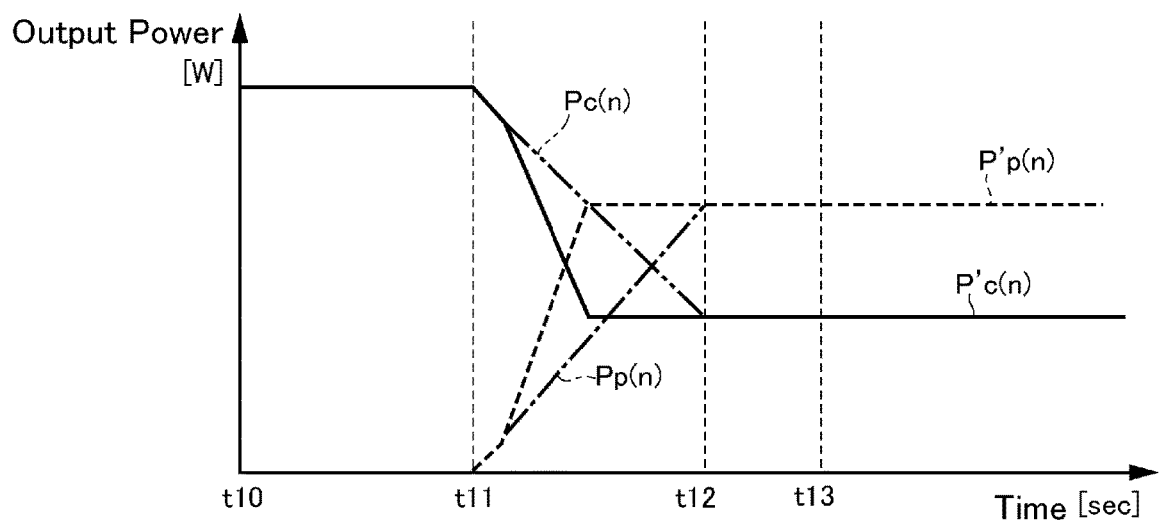
FIG. 14 is a time chart showing another example of correcting the command value by increasing generation amount of the generator.

If the shortfall ΔPh can be covered by increasing the generation amount of the electrical power generating system 4 so that the answer of step S22 is YES, the routine progresses to step S23 to calculate a command value Pc'(n) based on an assumption that the generation amount Pg of the electrical power generating system 4 is increased. As the foregoing step S7, at step S23, the command value Pc'(n) is calculated based on an assumption that the generation amount Pg(n) of the electrical power generating system 4 at the point when the command value Pc(n) was calculated at step S1 is increased. That is, at step S23, the command value Pc'(n) is calculated by subtracting the increased amount ΔP of the generation amount Pg(n) of the electrical power generating system 4 from the command value Pc(n) calculated at step S1. One example of the command value Pc'(n) calculated at step S23 is shown in FIG. 14. In FIG. 14, the solid line represents the command value Pc'(n) calculated at step S23, the dashed-two dotted line represents the command value Pc(n) calculated at step S1, the dashed line represents a generation amount Pg'(n) of the electrical power generating system 4 at the point when the command value Pc'(n) was calculated at step S23, and the dashed-dotted line represents the generation amount Pg(n) of the electrical power generating system 4 at the point when the command value Pc(n) was calculated at step S1.

Then, at step S24, a predicted value Pp'(n) is calculated based on an assumption that the electric storage device 3 discharges the electric power in an amount of the command value Pc'(n) calculated at step S23. As the foregoing step S8, the predicted value Pp'(n) may be calculated by substituting the command value Pc'(n) calculated at step S23 for the command value Pc(n) calculated at step S1 in the procedures to calculate the predicted value Pp(n) at step S2.

Thereafter, it is determined at step S25 whether the predicted value Pp'(n) calculated at step S24 is equal to the command value Pc'(n) calculated at step S23. That is, as the foregoing step S3, it is determined at step S25 whether the electric power can be supplied from the electric storage device 3 to the motor 2 in the amount of the command value Pc'(n). As described, the command value Pc'(n) is calculated based on the shortfall of the electric power calculated on the assumption that the electric storage device 3 discharges the electric power in the amount of the command value Pc(n) calculated at step S1. Therefore, the predicted value Pp'(n) basically corresponds to the command value Pc'(n). However, the command value may be changed due to deviation of actual values of an external temperature and a running load from predicted values of those parameters. That is, such determination at step S25 is made for the purpose of confirmation.

If the predicted value Pp'(n) is equal to the command value Pc'(n) so that the answer of step S25 is YES, the routine progresses to step S26 to set a target output power of the electric storage device 3 to the command value Pc'(n), and to set a target generation amount of the electrical power generating system 4 to the generation amount Pg'(n). Thereafter, the routine returns.

By contrast, if the predicted value Pp'(n) is less than the command value Pc'(n) so that the answer of step S25 is NO, the routine progresses to step S27 to calculate the shortfall ΔPh again, and thereafter returns to Step S22. In this case, steps S22 to S25 and step S27 are repeated until the predicted value Pp'(n) and the command value Pc'(n) are equalized to each other, or, or until the generation amount Pg(n) of the electrical power generating system 4 cannot be increased any longer.

Figure 15:
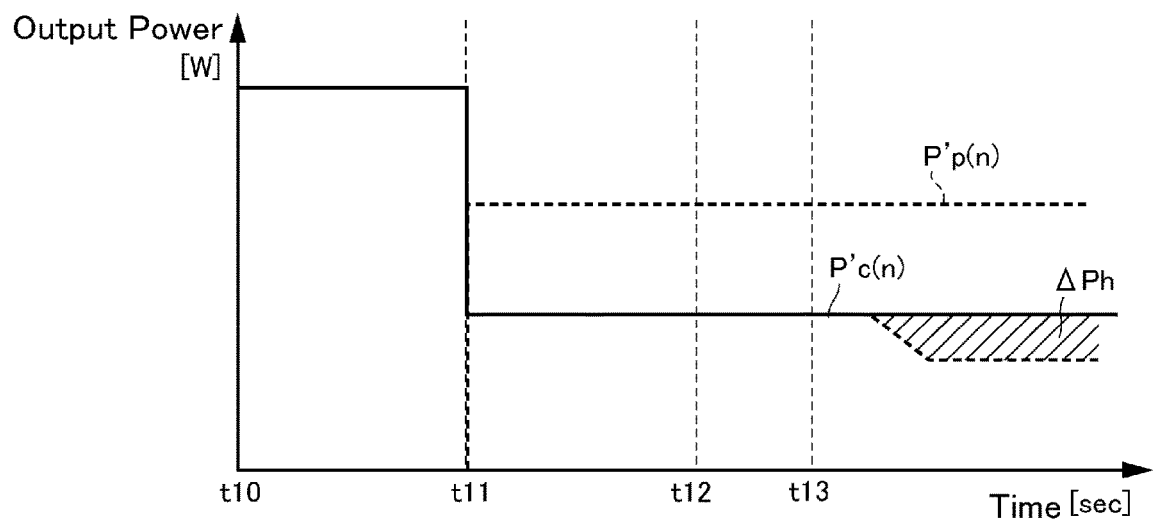
FIG. 15 is a time chart showing another example of the predicted value of the output power of the electric storage device corrected based on the corrected command value.

Otherwise, if the shortfall ΔPh cannot be covered even if the generation amount Pg(n) of the electrical power generating system 4 has been increased to the maximum value by repeating steps S22 to S25 and step S27 as indicated in FIG. 15, the answer of step S22 will be NO. In this case, the routine progresses to step S28 to determine whether it is possible to cover the shortfall ΔPh calculated at step S21, S27, or after-mentioned step S34 by advancing the timing to start power generation of the electrical power generating system 4. If the electrical power generating system 4 has already started power generation, or if the shortfall ΔPh may not be generated even if the electrical power generating system 4 starts power generation immediately, the answer of step S28 will be NO.

If the answer of step S28 is NO, the routine progresses to step S29 to continue power generation of the electrical power generating system 4 or to start power generation of the electrical power generating system 4 immediately. Specifically, at step S29, an increase in the internal resistance of the electric storage device 3 is suppressed as much as possible. For this purpose, the generation amount of the electrical power generating system 4 is set to the maximum value, and the target value of the output power of the electric storage device 3 is maintained to the command value Pc'(n)

calculated based on the generation amount of the electrical power generating system 4. Thereafter, the routine returns.

By contrast, if the shortfall ΔPh can be covered by advancing the timing to start power generation of the electrical power generating system 4 so that the answer of step S28 is YES, the routine progresses to step S30 to calculate a command value Pc'(n) based on an assumption that the timing to start power generation of the electrical power generating system 4 is advanced to cover the shortfall ΔPh. Specifically, at step S30, the command value Pc'(n) may be calculated by altering the timing to start power generation of the electrical power generating system 4 on the occasion of calculating the command value Pc(n) at step S1 to a timing possible to cover the shortfall ΔPh.

Then, at step S31, a predicted value Pp'(n) is calculated based on an assumption that the electric storage device 3 discharges the electric power in an amount of the command value Pc'(n) calculated at step S30. Specifically, the predicted value Pp'(n) is calculated by substituting the command value Pc'(n) calculated at step S30 for the command value Pc(n) calculated at step S1 in the procedures to calculate the predicted value Pp(n) at step S2.

Thereafter, it is determined at step S32 whether the predicted value Pp'(n) calculated at step S31 is equal to the command value Pc'(n) calculated at step S30. That is, as the foregoing step S3, it is determined at step S31 whether the electric power can be supplied from the electric storage device 3 to the motor 2 in the amount of the command value Pc'(n). As described, the command value Pc'(n) is calculated based on the shortfall of the electric power calculated on the assumption that the electric storage device 3 discharges the electric power in the amount of the command value Pc(n) calculated at step S1. Therefore, the predicted value Pp'(n) basically corresponds to the command value Pc'(n). However, the command value may be changed due to deviation of actual values of an external temperature and a running load from predicted values of those parameters. That is, such determination at step S32 is also made for the purpose of confirmation.

If the predicted value Pp'(n) is equal to the command value Pc'(n) so that the answer of step S32 is YES, the routine progresses to step S33. At step S33, the target output power of the electric storage device 3 is set to the command value Pc'(n), the timing to start power generation of the electrical power generating system 4 is advanced to the point of time at which the predicted value Pp'(n) and the command value Pc'(n) are equalized to each other, and the target generation amount of the electrical power generating system 4 after starting the power generation is set to the maximum value. Thereafter, the routine returns.

Figure 16:
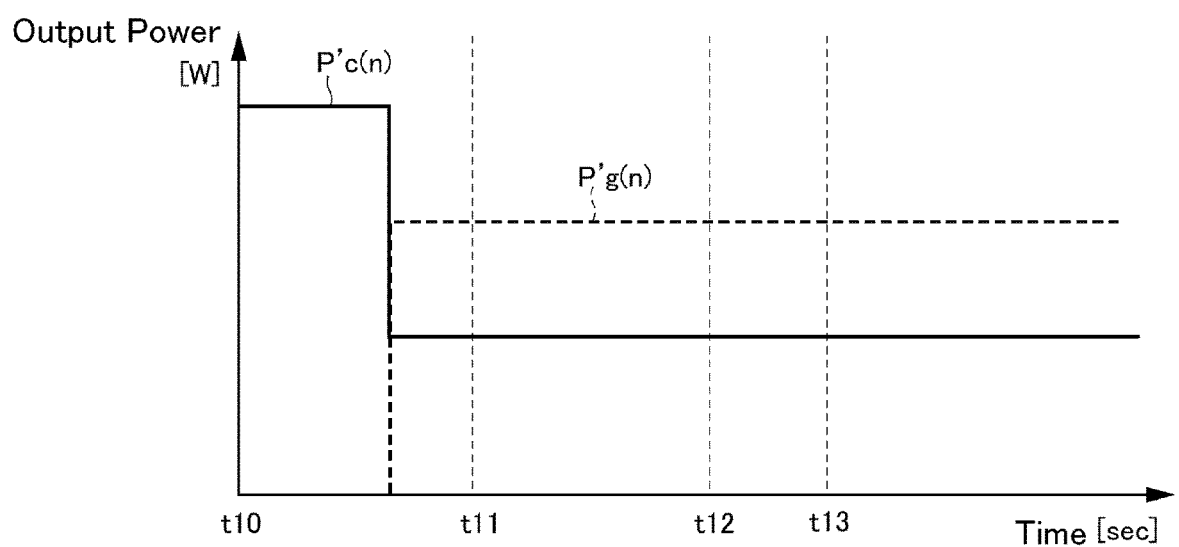
FIG. 16 is a time chart time chart showing another example of advancing the timing to start power generation of the generator.

By contrast, if the predicted value Pp'(n) is less than the command value Pc'(n) so that the answer of step S32 is NO, the routine progresses to step S34 to calculate the shortfall ΔPh again, and thereafter returns to step S28. In this case, the timing to start power generation of the electrical power generating system 4 is advanced until the predicted value Pp'(n) and the command value Pc'(n) are equalized to each other, until it cannot be advanced any longer, or until the shortfall ΔPh becomes unfeasible even if the timing to start power generation of the electrical power generating system 4 is advanced. Turning to FIG. 16, there is shown another example of the command value Pc'(n) of the case in which the predicted value Pp'(n) and the command value Pc'(n) are equalized to each other by advancing the timing to start power generation of the electrical power generating system 4. In FIG. 16, the solid line represents the command value Pc'(n), and the dashed line represents a generation amount Pg'(n) of the electrical power generating system 4 of this case.

If the command value Pc(n) and the predicted value Pp(n) are equal to each other so that the answer of step S3 is YES, the routine progresses to step S5 to control the output power of the electric storage device 3 based on the command value Pc(n) without executing the load reducing control.

As described, the internal resistance of the electric storage device is increased temporarily when the load on the electric storage device 3 is relatively high. Therefore, the advantages of the routine shown in FIG. 2 may also be achieved by increasing the generation amount of the electrical power generating system 4 based on the shortfall ΔPh as an integrated value of the difference between the command value Pc(n) and the predicted value Pp(n).

Although the above exemplary embodiment of the present disclosure has been described, it will be understood by those skilled in the art that the present disclosure should not be limited to the described exemplary embodiments, and various changes and modifications can be made within the scope of the present disclosure. For example, an execution of the load reducing control may be determined by executing any one of the subroutines shown in FIG. 5 or FIG. 11.

What is claimed is:

1. A control system for a vehicle comprising:
a motor as a prime mover that is connected to a pair of drive wheels to deliver torque to the drive wheels;
an electric storage device that is connected to the motor to supply an electric power to the motor, and whose available output power is reduced due to increase in an internal resistance resulting from discharging the electric power continuously; and
a generating system that is connected to the motor to supply an electric power to the motor without passing through the electric storage device,
the control system comprising:
a controller that controls an output power of the electric storage device and a generation amount of the generating system,
wherein the controller is configured to
calculate a command value of the output power of the electric storage device to be transmitted to the motor in a future time,
predict the internal resistance of the electric storage device at a point to discharge the electric power from the electric storage device in the amount of the command value,
calculate a predicted value of the available output power of the electric storage device in a future time based on the predicted internal resistance,
determine whether it is possible to discharge the electric power from the electric storage device in the amount of the command value in a future time, and
execute a load reducing control to reduce the output power of the electric storage device by increasing an amount of the electric power supplied to the motor from the generating system greater than the amount of the electric power supplied to the motor from the generating system of the case where it is expected that the electric storage device will be possible to discharge the electric power in the amount of the command value, before a point at which the electric storage device can no longer discharge the electric power in the amount of the command value, if it is expected that the electric storage device will not be possible to discharge the electric power in the amount of the command value.

2. The control system for the vehicle as claimed in claim 1, wherein the load reducing control includes a control to increase the generation amount of the generating system, if the electric power is supplied to the motor from the generating system before the point at which the electric storage device can no longer discharge the electric power in the amount of the command value.

3. The control system for the vehicle as claimed in claim 1,
wherein the controller is further configured to predict a timing at which a predetermined condition to start power generation of the generating system will be satisfied, and
the load reducing control includes a control to increase the amount of the electric power supplied to the motor from the generating system by advancing a timing to start power generation of the generating system to a point before a point at which the predetermined condition to start power generation of the generating system will be satisfied.

4. The control system for the vehicle as claimed in claim 1,
wherein the controller is further configured to predict a timing at which a predetermined condition to start power generation of the generating system will be satisfied, and
the load reducing control includes a control to increase the amount of the electric power supplied to the motor from the generating system by advancing a timing to start power generation of the generating system to a point before a point at which the predetermined condition to start power generation of the generating system will be satisfied, while increasing the generation amount of the generating system to a maximum value after starting power generation.

5. The control system for the vehicle as claimed in claim 1, wherein the controller is further configured to correct the command value and the internal resistance based on the generation amount of the generating system during execution of the load reducing control.

6. The control system for the vehicle as claimed in claim 1, wherein the controller is further configured to calculate the command value based on a change in the output power of the electric storage device within a predetermined past period of time.

7. The control system for the vehicle as claimed in claim 6, wherein the controller is further configured to increase the command value in accordance with reductions in an external temperature and an external pressure.

8. The control system for the vehicle as claimed in claim 1, wherein the controller is further configured to predict the internal resistance based on at least any one of a temperature, a state of charge level, and a deterioration of the electric storage device, on the assumption that the electric storage device discharges the electric power in an amount of the command value.

9. The control system for the vehicle as claimed in claim 1,
wherein the generating system includes an engine and a generator, and
a maximum output power of the engine is smaller than a maximum output power of the motor.

* * * * *